US009220999B2

(12) United States Patent
Becker et al.

(10) Patent No.: US 9,220,999 B2
(45) Date of Patent: Dec. 29, 2015

(54) IN-LINE SINGLE OUTLET FILTER WITH AUTOMATIC CLOGGED FILTER ELEMENT BYPASS

(75) Inventors: Aaron Becker, Atlanta, GA (US); Myron Stein, Laguna Niguel, CA (US)

(73) Assignee: AirSept, Inc., Atlanta, GA (US)

(*) Notice: Subject to any disclaimer, the term of this patent is extended or adjusted under 35 U.S.C. 154(b) by 647 days.

(21) Appl. No.: 13/365,493

(22) Filed: Feb. 3, 2012

(65) Prior Publication Data

US 2013/0200003 A1  Aug. 8, 2013

(51) Int. Cl.
| B01D 35/06 | (2006.01) |
| B01D 35/02 | (2006.01) |
| B01D 35/147 | (2006.01) |
| B01D 29/33 | (2006.01) |
| B01D 29/11 | (2006.01) |

(52) U.S. Cl.
CPC .............. *B01D 29/114* (2013.01); *B01D 29/33* (2013.01); *B01D 35/02* (2013.01); *B01D 35/06* (2013.01); *B01D 35/147* (2013.01); *B01D 2201/4069* (2013.01)

(58) Field of Classification Search
CPC .......... B03C 1/28; B03C 1/286; B03C 1/288; B03C 1/30; B03C 2201/18; B03C 2201/20; B03C 2201/30; B01D 2201/4069; B01D 29/114; B01D 29/33; B01D 35/02; B01D 35/06; B01D 35/147
See application file for complete search history.

(56) References Cited

U.S. PATENT DOCUMENTS

| 3,371,790 A | 3/1968 | Kudlaty et al. |
| 3,727,761 A | 4/1973 | Aspinwall et al. |
| 3,890,232 A * | 6/1975 | Combest et al. ............... 210/223 |
| 6,613,220 B2 * | 9/2003 | Golovatai-Schmidt ........ 210/130 |
| 7,890,165 B2 | 2/2011 | Wahlstrand et al. |
| 2003/0010697 A1 * | 1/2003 | Sann et al. .................... 210/234 |
| 2006/0102533 A1 | 5/2006 | Faria |
| 2009/0242816 A1 * | 10/2009 | Husband et al. ............ 251/149.9 |

FOREIGN PATENT DOCUMENTS

| AU | 548 461 B2 | 12/1985 |
| EP | 0 071 877 A2 | 2/1983 |
| WO | WO 2007/144680 A1 | 12/2007 |

OTHER PUBLICATIONS

Frequently Asked Questions, British Stainless Steel Association, Accessed Feb. 24, 2015, www.bssa.org.uk/faq.php?id=24. pp. 1-2.*

(Continued)

*Primary Examiner* — David C Mellon
(74) *Attorney, Agent, or Firm* — Womble Carlyle Sandridge & Rice LLP

(57) ABSTRACT

An in-line filter is disclosed for filtering fluid flowing through a hydraulic system, particularly an automotive hydraulic system. The filter has a magnetic base with a central opening at its outlet and a seat with a central opening at its inlet. The base and the seat are joined by a cylindrical filter element made of a magnetically susceptible mesh screen material. A spring within the filter element biases a ball against the central opening of the seat normally sealing off the opening and forcing fluid to flow through the filter element to be filtered. If the mesh screen becomes clogged, backpressure forces the ball away from the seat against the bias of the spring to allow fluid to bypass the filter element and flow directly through the filter. Ferrous debris within the fluid flow continues to be captured by attraction to the magnetic base and the magnetized filter element.

18 Claims, 4 Drawing Sheets

(56) References Cited

OTHER PUBLICATIONS

International Preliminary Report on Patentability and Written Opinion for PCT/US2013/024327 dated Aug. 18, 2014.

International Search Report—& Written Opinion PCT/US2013/024327, May 17, 2013, AirSept, Inc.

\* cited by examiner

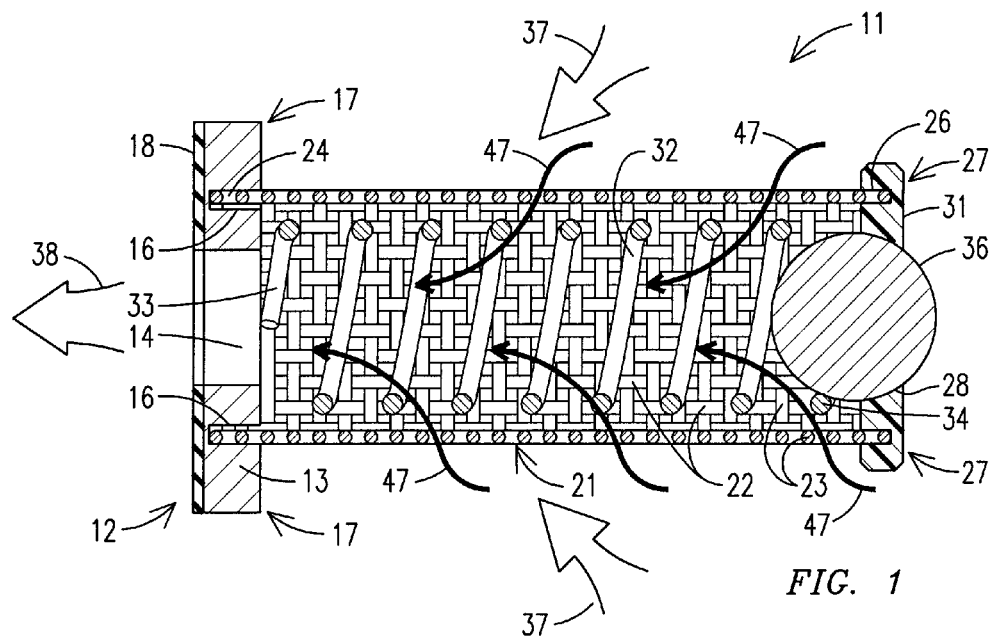
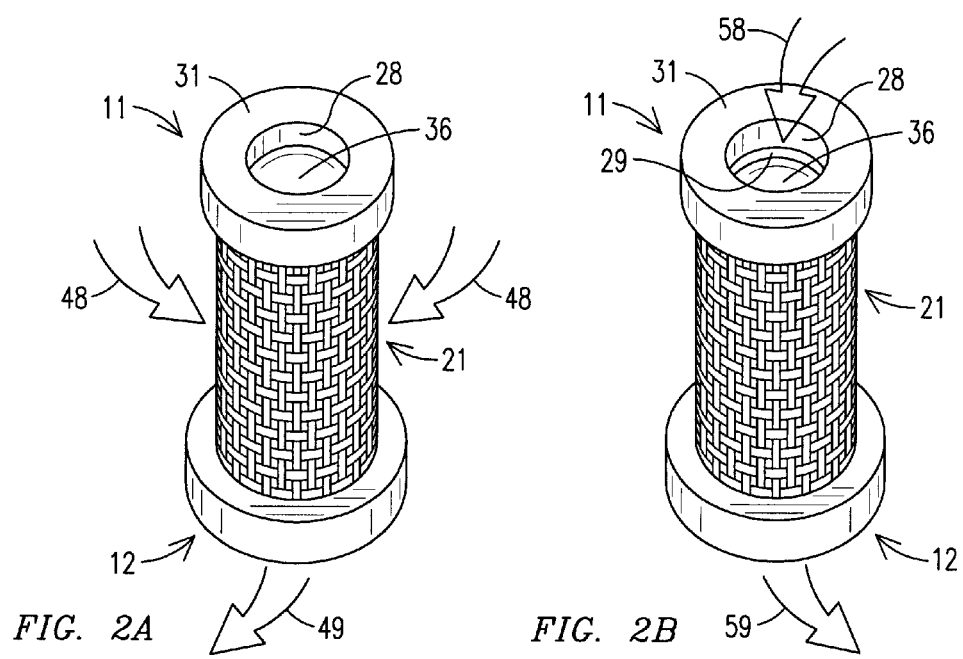
FIG. 1
FIG. 2A
FIG. 2B

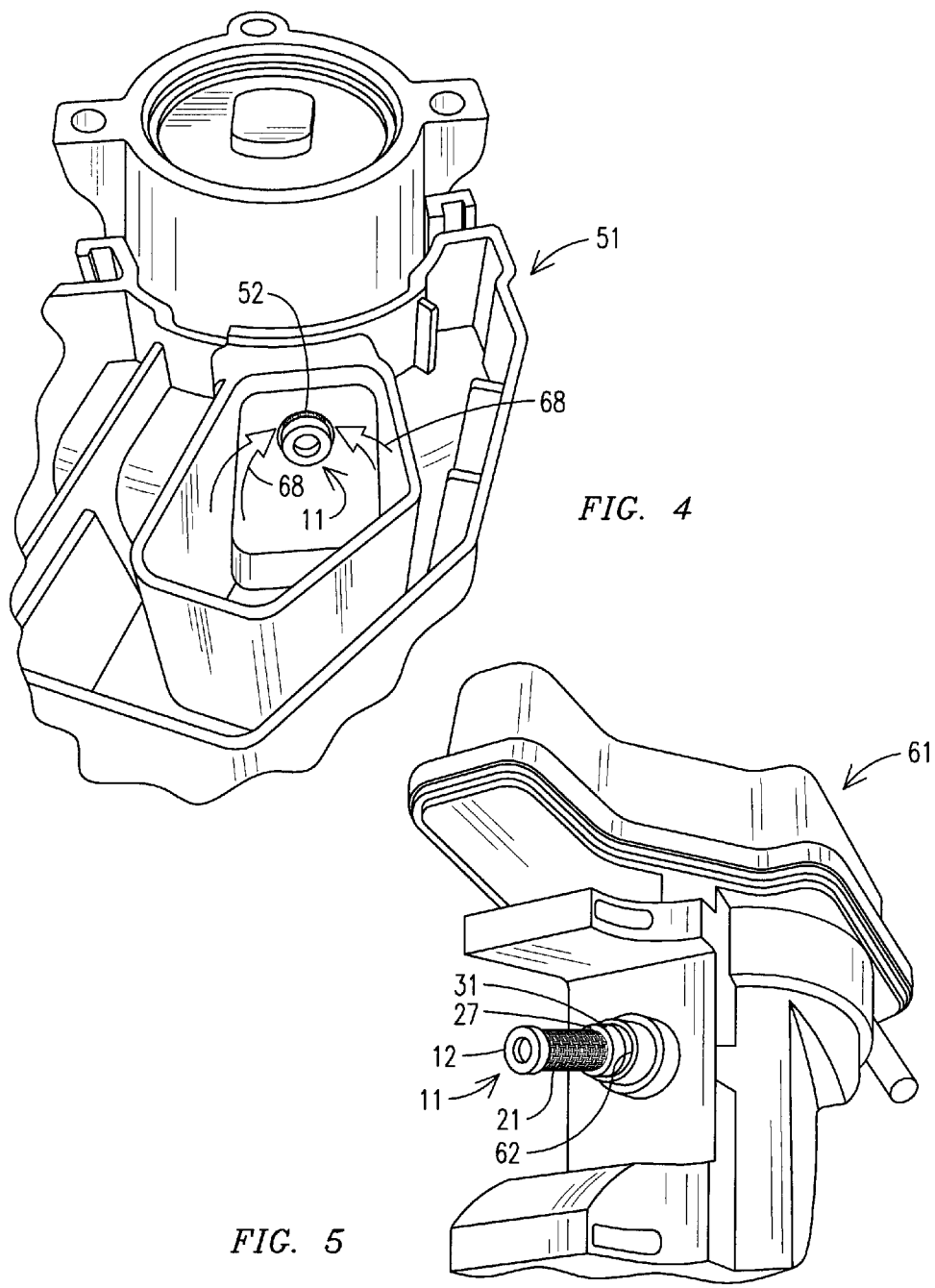

IN-LINE SINGLE OUTLET FILTER WITH AUTOMATIC CLOGGED FILTER ELEMENT BYPASS

TECHNICAL FIELD

This disclosure relates generally to filters for filtering foreign debris from fluid flows, and more particularly to filters for filtering circulating automotive fluids such as hydraulic fluid, refrigerant, power steering fluid, and the like.

BACKGROUND

Filtering fluids as they circulate through automotive systems such as power steering systems, air conditioning systems, hydraulic systems, and the like can significantly increase the lifetimes of such systems and is therefore desirable. In this context, there is a need for a compact in-line or in situ filter that has a single outlet and a first or normal inlet path wherein fluid passes through a filter element before exiting the single outlet and a second or bypass path wherein fluid bypasses the filter element when it becomes clogged before exiting the single outlet. Further, the filter should be easily installable, easily replaceable, and should continue to capture certain types of debris even when operating in its bypass mode. It is to the provision of such a filter that the present invention is primarily directed.

SUMMARY

Briefly described, a fluid filter comprises a generally annular base having a central outlet opening and being formed at least partially of a magnetic material. An annular groove in the base receives one end of a cylindrical mesh screen filter element that is bonded to the base and extends therefrom to an inlet end. The filter element is made of a ferrous material as well such that the screen itself becomes magnetized by being in contact with the magnetic base. The inlet end of the filter element carries an at least partially pliable seat having a central opening that may be smaller than the central outlet opening of the base. A conical compression spring is disposed within the filter element with its large end resting on the base and its small end cradling a ball. The force of the compression spring normally biases and urges the ball against the central opening of the seat thereby closing off flow through this central opening. The ball is made of a non-magnetic material so that it is does not become magnetized. The filter is installable in-line or in situ within an inlet port or an outlet port of a component such as a fluid reservoir with its inlet end facing the direction of fluid flow.

The tension or spring constant of the conical spring is selected such that under normal conditions, the ball prevents fluid from flowing through the seat and forces it to flow around the filter, through the mesh openings of the filter element, and exit through the single outlet in a normal mode of operation. If, however, the filter element becomes clogged with debris, the force of the backpressure generated in the fluid by the clog is sufficient to overcome the force of the compression spring and force the ball out of engagement with the seat. This opens up the central opening of the seat, allowing fluid to flow through the seat before exiting from the single outlet of the filter in a bypass mode of the filter. In both modes, the fluid flows past the magnetized filter element and out through the single central outlet opening of the magnetic base so that ferrous debris that may be entrained in the flow continues to be captured by the filter element and the base.

These and other features, aspects, and advantages of the invention will be better understood by the skilled artisan upon review of the detailed description set forth below when taken in conjunction with the accompanying drawing figures, which are briefly described as follows.

BRIEF DESCRIPTION OF THE DRAWINGS

FIG. 1 is a cross sectional view of a filter that embodies principles of the invention in one preferred form.

FIGS. 2a and 2b are perspective views of the filter of FIG. 1 in its normal operating mode (FIG. 2a) and in its bypass operating mode (FIG. 2b).

FIG. 4 is a perspective partially cut away view showing the inlet end of the filter of FIG. 1 within a component through which fluid circulates.

FIG. 5 is a perspective view illustrating initial installation of a filter shown in FIG. 1 into an outlet port of a component prior to attaching a coupler to the port.

DETAILED DESCRIPTION

Figure 3:
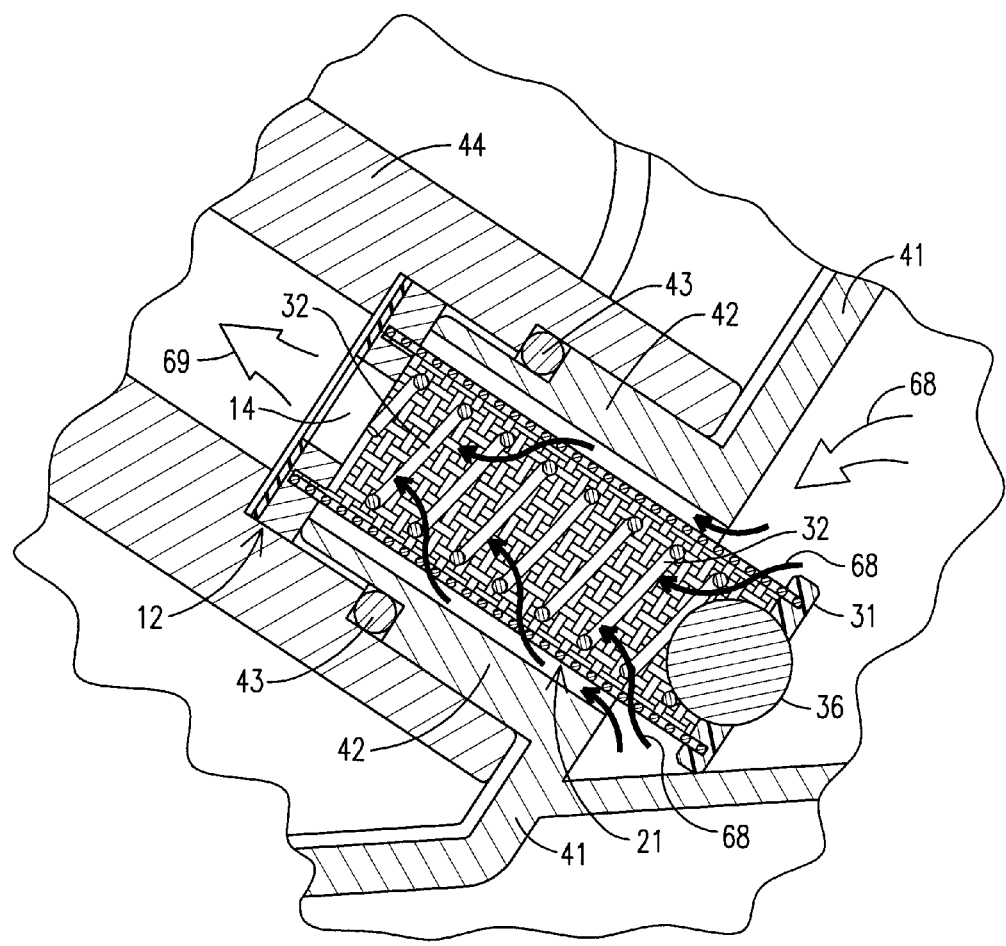
FIG. 3 is a cross sectional view of the filter of FIG. 1 shown installed in an outlet port of a component through which fluid circulates.

Referring now in more detail to the drawing figures, wherein like reference numerals indicate like parts throughout the several views, FIG. 1 illustrates in cross section a filter that embodies principles of the invention in one preferred form. The filter 11 comprises a base 12 made up of a generally annular magnet 13 having a central outlet opening 14. A rubberized gasket 18 may be attached to the magnet for certain applications. The magnet 13 is formed with an annular groove or slot 16 that surrounds the central outlet opening. A cylindrical filter element 21 is constructed of woven mesh screen material having circular elements 22 interwoven with longitudinal elements 23. The size of the openings or mesh size of the filter element can be selected to filter out of a fluid stream, any particles above a particular size that may cause damage to pumps or other components of a system. Furthermore, the material from which the elements are made is intentionally selected to be ferrous or otherwise magnetically susceptible.

The filter element has an outlet end 24 and an inlet end 26 opposite the outlet end. The outlet end of the filter element is disposed and bonded securely within the annular slot 16 of the base 12 and extends axially away from the base 13 to the inlet end of the filter element. Since the filter element is made of a ferrous material, the mesh screen of the filter element becomes magnetized by being in contact with the annular magnetic base. The outlet end may be bonded with appropriate adhesive, sealant, epoxy, or other mechanisms that insure that the end of the filter element will not separate from the base during use.

An annular seat 31 has a central opening 28 and is bonded to the inlet end of the filter element with its central opening coaxially aligned with the axis of the filter element. The annular seat may be formed of any appropriate material, but preferably is formed of a polymer material that is somewhat compliant, for purposes discussed below. The seat may or may not have a radially projecting rim 27 that extends outwardly from the filter element depending upon the particular application to which the filter is to be applied. A compression spring 32 is disposed inside the filter element 21 and has an outlet end portion 33 and an inlet end portion 34. The compression spring in the illustrated embodiment is conically shaped in that the diameter of the spring at its outlet end 33 is greater than the diameter of the spring at its inlet end 34.

A ball 36 is cradled in the inlet end of the conical spring and the spring constant is selected such that the ball 36 is yieldably biased by the spring 32 against the perimeter of the central opening 28 of the seat. As such, the ball 36 seals the central opening of the seat and defines a normal operating mode of the filter. The ball is made of a non-ferrous or otherwise non-magnetically susceptible material so that it does not become magnetized by being in proximity to the magnetic base or magnetized screen of the filter element. In the normal operating mode, fluid being circulated from the inlet end of the filter toward the outlet end of the filter flows around the seat 31, passes through the filter element 21, and flows out through the single central opening 14 of the base 12 as indicated by arrows 37, 47, and 38. In the process, the fluid is filtered in that the filter element captures particles larger than the mesh size of the filter's mesh screen that are entrained in the fluid. In addition, some ferrous particles entrained in the flow are captured by the magnetized screen through magnetic attraction even if the ferrous particles are smaller than the mesh size of the filter screen. Finally, as the filtered fluid flows through the central opening 14 of the base, the magnet 13 attracts remaining small particles of ferrous material that may have evaded capture by the filter element and still be entrained in the flow. What emerges from the central opening 14 is a filtered fluid with ferrous particles removed or greatly reduced. This filtering and cleaning occurs continuously as the fluid traverses a flow path in line with which the filter 11 is disposed.

After a period of operation, the filter element screen may become clogged with captured particles such that fluid flow through the filter element is choked off to an unacceptable extent. The fluid must nevertheless be allowed to circulate so that the system such as a power steering system supported by the fluid continues to operate. Accordingly, should the filter element become clogged, the resulting back pressure generated in the fluid upstream of the filter rises to an amount sufficient to overcome the force of the spring 32 holding the ball 36 against the seat 31. The ball 36 then moves away from the seat to open a path through the central opening 28 of the seat 31 allowing fluid to flow directly into the filter element without passing through the mesh screen material and exit directly out the central opening of the base 12. In this bypass operating mode of the filter, the now clogged filter element screen is bypassed and the fluid is not filtered by the screen. Nevertheless, damaging ferrous particles entrained in the fluid continue to be removed as the fluid flows past the still magnetized screen and through the central opening 14 of the magnetic base 12. In the process, ferrous particles in the flow are not attracted to the ball 36 since it is made of a non-ferrous material and does not become magnetized. This eliminates contamination of the ball by ferrous particles sticking to its surface. Of course, a clogged condition of the filter should be avoided through regular maintenance and replacement of the filter; but, in the event maintenance is neglected, the bypass mode of the filter element ensures that fluid will continue to circulate and automotive systems supported by this flow will continue to operate.

FIG. 2a is a perspective view of the filter 11 in its normal operating mode wherein the filter element screen is not clogged. The ball 36, which preferably is made of stainless steel, nickel coated metal, PTFE, or some other non-magnetic, non-corrosive, smooth surfaced material, is seen biased against the periphery of the central opening 28 of the seat 31 thereby sealing off the central opening. Under these conditions, fluid is forced to flow around the seat, through the mesh screen material of the filter element, and exit out the single central opening of the base 12, as indicated by arrows 48 and 49 in FIG. 2a. FIG. 2b illustrates the configuration of the filter 11 in its bypass mode wherein the mesh screen of the filter element 21 has become clogged with captured debris from the fluid. In this mode, the backpressure generated by the clogged filter element as a result either of pressure or suction depending upon which side of a pump the filter is located, has overcome the bias of the spring within the filter element, forcing the ball 36 away from the central opening 28 of the seat 31 opening up a gap 29 therebetween. Fluid is now free to enter the filter 11 through the open central opening 28 of the seat, flow around the non-magnetized ball 36 and through gap 29 into the interior of the magnetized filter element 21, and exit the filter through the central opening of the magnetic base 12 as indicated by arrows 58 and 59. To allow the fluid to flow freely around the ball, the ball is somewhat smaller in diameter than the internal diameter of the filter element and, as mentioned, is made of a non-magnetically susceptible material and is thus not magnetized and does not attract ferrous debris. The tapered nature of the conical spring 32 cradles and supports the smaller ball at is inlet end while forming a larger diameter base to rest securely on the base 12 against the inside of the screen element at its outlet end.

The spring constant of the conical spring 32 and thus the force applied by the spring to the ball may be selected to be appropriate for a particular intended application in which the filter 11 is to be used. For example, in lower pressure systems such as a power steering system, the spring constant may be lower so that the bypass mode is initiated by a lower back pressure upstream of a clogged filter. Conversely, in a higher pressure system such as in hydraulic drive systems, the spring constant may be higher so that higher back pressure is required to initiate the bypass mode of the filter.

FIG. 3 shows the filter 11 in one exemplary application where the filter 11 is installed within an outlet port 42 of an automotive component casing 41 through which fluid circulates. In this application, the filter is inserted into the outlet port and a hose coupler 44 is attached to the outlet port to receive fluid flowing out of the outlet port. The filter is shown in its normal operating mode, meaning that the filter element screen is not clogged and is passing fluid normally. The fluid thus enters the filter through the filter element 21, is filtered thereby, and exits through the central opening 14 of the base from where it flows through a hose or directly into another component in a next successive circulation. While not shown in FIG. 3, it will be understood from the discussion above that should the filter element screen become clogged, backpressure within the component 41 forces the ball to the left thereby initiating the bypass mode of the filter 11. FIG. 4 shows the inlet end of the filter 11 inside an automotive component 51; the component having been opened up to reveal its interior portions. Fluid flows around the filter 11, through the mesh screen of the filter element, and out the outlet of the component as indicated by arrows 68 and as described above.

Figure 6:
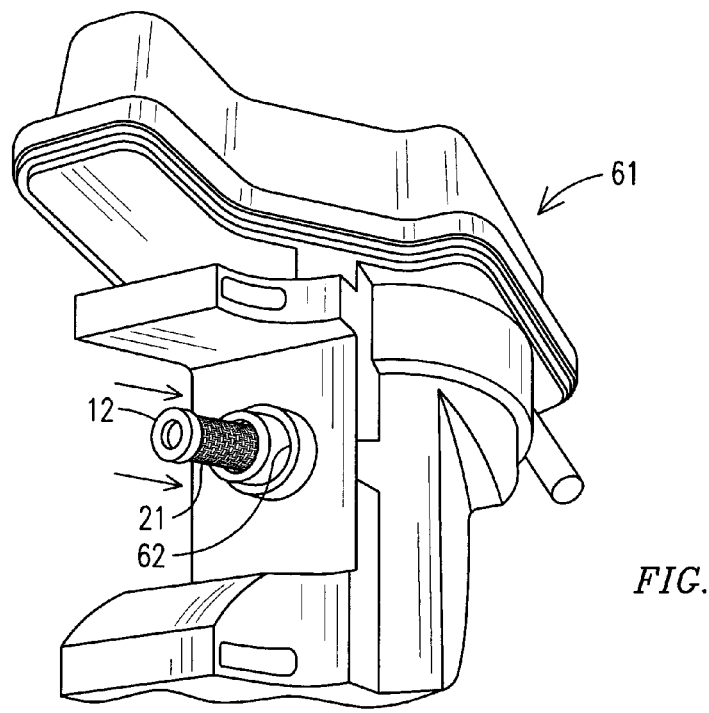
FIG. 6 is a perspective view illustrating continued installation of a filter shown in FIG. 1 into an outlet port of a component prior to attaching a coupler to the port.
Figure 7:
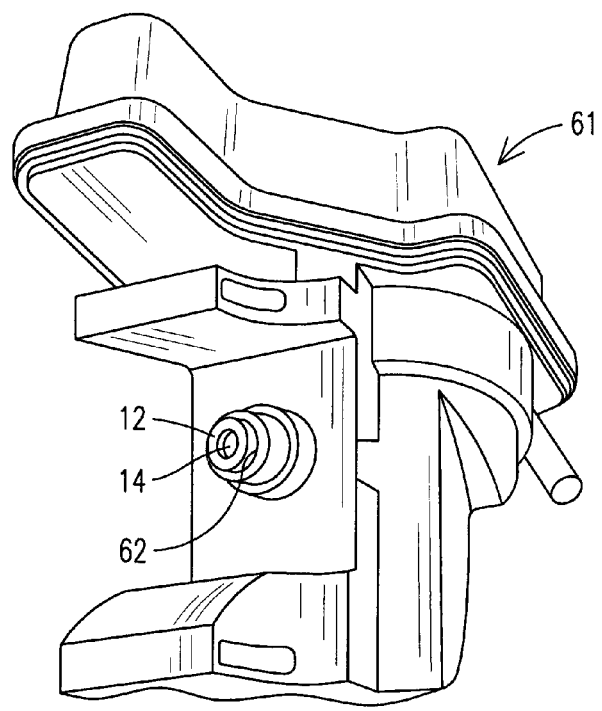
FIG. 7 is a perspective view illustrating final installation of a filter shown in FIG. 1 into an outlet port of a component prior to attaching a coupler to the port.

Finally, FIGS. 5, 6, and 7 illustrate progressively the ease with which the filter of this invention is installed in an outlet port 62 of an automotive component 61. In FIG. 5, the filter 11 is being inserted into the outlet port 62 with its inlet end 31 first. In this particular application, the seat defines a radially projecting rim 27. In FIG. 6, the filter 11 is urged into the outlet port in the direction indicated by the arrows and in FIG. 7 the filter is shown completely inserted into the outlet port with the radially projecting flange portion 17 (FIG. 1) of the base 12 resting against the rim of the outlet port. A coupler may then be attached to the outlet port to receive filtered fluid from the component 61 as described above. The coupler may be part of another component that receives the fluid; or, it may be a hose coupler that receives the fluid and conveys it to a remote location within the fluid circuit. The fluid may be forced to flow by pressure generated by a pump upstream of the component containing the filter or by suction generated by a pump downstream of the component containing the filter.

The invention has been described herein in terms of preferred embodiments and methodologies considered by the inventor to represent the best mode of carrying out the invention. It will be understood by the skilled artisan; however, that a wide range of additions, deletions, and modifications, both subtle and gross, may be made to the illustrated and exemplary embodiments without departing from the spirit and scope of the invention set forth in the claims.

What is claimed is:

1. A fluid filter comprising:
    a base having a central outlet opening and being formed at least partially of a magnetic material that surrounds the central outlet opening;
    a tubular filter element having openings of a predetermined size and an outlet end fixed to and contacting the base and extending from the base to an inlet end, the outlet end of the tubular filter element surrounding the central outlet opening;
    the tubular filter element being constructed of a magnetically susceptible material such that the contact between the outlet end of the tubular filter element to and the magnetic material of the base magnetizes the tubular filter element;
    a seat fixed to the inlet end of the tubular filter element, the seat having a central inlet opening surrounded by the inlet end of the tubular filter element;
    the seat being constructed of a material that is not magnetically susceptible such that the seat does not become magnetized by being fixed to the inlet end of the tubular filter element;
    a spring disposed within the tubular filter element, the spring having an entrance end portion adjacent the seat and an exit end portion adjacent the base;
    a ball having a diameter larger than a diameter of the central inlet opening of the seat and being located within the tubular filter element between the entrance end of the spring and the seat;
    the ball being constructed of a material that is not magnetically susceptible such that the ball does not become magnetized by being in proximity to the magnetic portion of the base and the magnetized tubular filter element;
    the spring having a spring constant adequate to hold the ball yieldably against the central inlet opening of the seat to seal the central inlet opening during normal operation of the fluid filter and yield to allow the ball to be displaced from the central inlet opening of the seat in response to a predetermined pressure exerted on the ball when the tubular filter element is clogged to allow fluid to pass around the ball and through the fluid filter without passing through the tubular filter element;
    the magnetic portion of the base and the magnetized tubular filter element capturing metal particles within a fluid moving therethrough during normal operation of the fluid filter; and
    the ball and the seat not capturing and collecting metal particles within the fluid when the tubular filter element is clogged and the ball is displaced from the central inlet opening of the seat.

2. A fluid filter as claimed in claim 1 and wherein the spring comprises a coil compression spring.

3. A fluid filter as claimed in claim 2 and wherein the coil compression spring is generally conical in shape being larger in diameter at the exit end portion and smaller in diameter at the entrance end portion.

4. A fluid filter as claimed in claim 1 and wherein the ball is made of a corrosion resistant material.

5. A fluid filter as claimed in claim 4 and wherein the ball has a size less than an internal size of the tubular filter element so that a passage is defined between the ball and the tubular filter element.

6. A fluid filter as claimed in claim 1 and wherein the base is generally annular in shape, the tubular filter element is generally cylindrical in shape, and the seat is generally annular in shape.

7. A fluid filter as claimed in claim 6 and wherein the base defines a flange projecting radially outwardly from the tubular filter element.

8. A fluid filter as claimed in claim 1 and further comprising a gasket on an exposed end of the base.

9. A fluid filter as claimed in claim 1 and wherein the spring is generally conical in shape.

10. A fluid filter as claimed in claim 1 and wherein the tubular filter element is sized to be inserted into an inlet port or an outlet port of a component through which fluid circulates to filter the circulating fluid.

11. A fluid filter for filtering fluid circulating through components in an automotive system, the fluid filter comprising:
    a generally annular base having a central opening, with at least a portion of the generally annular base that surrounds and defines the central opening being formed of a magnetic material;
    a groove formed in the magnetic material of the generally annular base surrounding the central opening;
    a filter element made of wire mesh of a predetermined mesh size, the filter element being generally cylindrical in shape having an outlet end and an inlet end, the outlet end of the filter element being disposed and bonded into the groove and in contact with the magnetic material;
    the filter element being constructed of a magnetically susceptible material such that the filter element becomes magnetized through the contact with the magnetic material;
    a generally annular seat bonded to the inlet end of the filter element, the generally annular seat having a central opening communicating with an interior of the filter element and being formed of an at least partially compliant material;
    a coil spring disposed within the filter element, the coil spring having an exit end resting on the generally annular base and an entrance end adjacent the generally annular seat;
    a ball disposed between the entrance end of the coil spring and the generally annular seat and being urged by the coil spring to a first position into engagement with the generally annular seat to seal the central opening of the generally annular seat;
    the ball being constructed of a material that is not magnetically susceptible such that the ball does not become magnetized by its proximity to the magnetic material of the generally annular base or the magnetized filter element;

the ball being displaceable to a second position away from the generally annular seat in response to excess fluid pressure on the ball to open up the central opening of the generally annular seat and permit fluid to flow through the central opening of the generally annular seat, into an interior of the filter element, and out through the central opening of the generally annular base;

the magnetized filter element and magnetic material of the generally annular base collecting metal particles entrained in the fluid when the ball is in its first position and when the ball is in its second position; and the non-magnetized ball and generally annular seat not attracting metal particles in the fluid so that the ball and the seat do not become covered with metal particles and rendered ineffective.

12. The fluid filter of claim 11 wherein the ball has a diameter smaller than a diameter of the filter element to define a fluid passage between the ball and the filter element when the ball is displaced from the generally annular seat.

13. The fluid filter of claim 12 and wherein the coil spring is generally conical having a larger diameter at the exit end and a smaller diameter at the entrance end.

14. A fluid filter for filtering fluid exiting a reservoir through an outlet aperture, the fluid filter comprising:

a base having a central outlet opening and being formed at least partially of a magnetic material that surrounds and defines the central outlet opening, and having a flange portion radially spaced from the central outlet opening and configured to seal around the outlet aperture;

a tubular filter element having an outlet end fixed to and contacting the base and surrounding the central outlet opening, and being configured for insertion into the outlet aperture for direct exposure to the fluid with the reservoir;

the tubular filter element being constructed of a magnetically susceptible material such that the contact between the outlet end of the tubular filter element and the magnetic material of the base magnetizes the tubular filter element;

a seat fixed to the inlet end of the tubular filter element, the seat having a central inlet opening surrounded by the inlet end of the tubular filter element;

the seat being constructed of a material that is not magnetically susceptible such that the seat does not become magnetized by being fixed to the inlet end of the tubular filter element;

a spring disposed within the tubular filter element, the spring having an entrance end portion adjacent the seat and an exit end portion adjacent the base;

a ball having a diameter larger than a diameter of the central inlet opening of the seat and being located within the tubular filter element between the entrance end of the spring and the seat;

the ball being constructed of a material that is not magnetically susceptible such that the ball does not become magnetized by being in proximity to the magnetic portion of the base and the magnetized tubular filter element;

the spring having a spring constant adequate to hold the ball yieldably against the central inlet opening of the seat to seal the central inlet opening during normal operation of the fluid filter and yield to allow the ball to be displaced from the central inlet opening of the seat in response to a predetermined pressure exerted on the ball when the tubular filter element is clogged to allow fluid to pass around the ball and through the fluid filter without passing through the tubular filter element;

the magnetic portion of the base and the magnetized tubular filter element capturing metal particles within a fluid moving therethrough during normal operation of the fluid filter; and the ball and the seat not capturing and collecting metal particles within the fluid when the tubular filter element is clogged and the ball is displaced from the central inlet opening of the seat.

15. A fluid filter as claimed in claim 14 and wherein the spring comprises a coil compression spring.

16. A fluid filter as claimed in claim 14 and wherein the ball is made of a corrosion resistant material.

17. A fluid filter as claimed in claim 14 and wherein the ball has a size less than an internal size of the tubular filter element so that a passage is defined between the ball and the tubular filter element.

18. A fluid filter as claimed in claim 14 and wherein the base is generally annular in shape, the tubular filter element is generally cylindrical in shape, and the seat is generally annular in shape.

* * * * *